(12) United States Patent
Chen et al.

(10) Patent No.: US 7,376,128 B2
(45) Date of Patent: May 20, 2008

(54) METHOD AND SYSTEM FOR VOICE HANDLING VIA DYNAMIC HOME AGENTS IN A NETWORK EMPLOYING ALL-IP ARCHITECTURE

(75) Inventors: Xiyuan Chen, Guangdong (CN); Baijun Zhao, Guangdong (CN); Zhiyu Xu, Guangdong (CN)

(73) Assignee: Utstarcom (China) Co., Ltd., Beijing (CN)

( * ) Notice: Subject to any disclaimer, the term of this patent is extended or adjusted under 35 U.S.C. 154(b) by 405 days.

(21) Appl. No.: 10/532,595

(22) PCT Filed: Oct. 25, 2002

(86) PCT No.: PCT/CN02/00759
§ 371 (c)(1),
(2), (4) Date: Oct. 26, 2005

(87) PCT Pub. No.: WO2004/039029
PCT Pub. Date: May 6, 2004

(65) Prior Publication Data
US 2006/0171371 A1  Aug. 3, 2006

(51) Int. Cl.
*H04Q 7/24* (2006.01)
(52) U.S. Cl. .................... 370/352; 370/338
(58) Field of Classification Search ........ 370/352
See application file for complete search history.

(56) References Cited
U.S. PATENT DOCUMENTS 6,523,068 B1 * 2/2003 Beser et al. ............... 709/238
6,657,991 B1 * 12/2003 Akgun et al. ............. 370/352
6,751,190 B1 * 6/2004 Swallow ................... 370/217
6,928,282 B2 * 8/2005 Taniguchi ................. 455/433
6,996,628 B2 * 2/2006 Keane et al. .............. 709/238
7,042,864 B1 * 5/2006 Leung et al. .............. 370/338
7,184,418 B1 * 2/2007 Baba et al. ................ 370/331

(Continued)

FOREIGN PATENT DOCUMENTS

CN  1283948 A  2/2001

(Continued)

*Primary Examiner*—Creighton Smith
(74) *Attorney, Agent, or Firm*—Berenato, White & Stavish

(57) ABSTRACT

The present invention provides a method for Voice Handling via Dynamic Home Agents in a Network employing All-IP Architecture, and a system for handling voice call by using this method. The method comprises the following steps: when a first RCU is about to initiate voice call with a second RCU, a first agent address FA will be assigned to a corresponding mobile RCU by the RNC in which the mobile RCU resides; when the RCUs perform the voice call, corresponding Media Gateway (MG) assigns second agent address HA1 and HA2 to the first and second RCUs, respectively. Wherein both HA1 and HA2 are only valid during this call, and when the call is terminated or dropped, HA1 and HA2 will be released back to the pool of the IP addresses of the corresponding MG. The first and second RCUs implement the voice call based on the assigned first and second agent addresses. This method handles voice calls services via Dynamic Home Agents technique in MobileIP, so as to reduce the number of propagation of the IP header in communication channel in a wireless environment, and enhance system resources utilization efficiency.

12 Claims, 5 Drawing Sheets

U.S. PATENT DOCUMENTS

2002/0054584 A1* 5/2002 Dempo .................. 370/338
2002/0191561 A1* 12/2002 Chen et al. ............. 370/331
2003/0091013 A1* 5/2003 Song et al. ............. 370/338

FOREIGN PATENT DOCUMENTS

EP          1030491 A       8/2000
WO       WO 01/172076       9/2001

* cited by examiner

METHOD AND SYSTEM FOR VOICE HANDLING VIA DYNAMIC HOME AGENTS IN A NETWORK EMPLOYING ALL-IP ARCHITECTURE

TECHNICAL FIELD

The present invention relates generally to a method for handling voice call in an all-IP network, and in particular, to a method for voice call handling via dynamic home agents in the wireless communication network employing the all-IP architecture, and to a wireless communication system for handling voice call utilizing this method.

BACKGROUND OF THE RELATED ART

In the current 3GPP release 4 architecture, both core-network (CN) and the interfaces connecting radio network controllers (RNC) and CN are IP-based, and during handling of the voice calls traffic, for example, fixed IP technique has been employed, that is, an exclusive IP-address is assigned respectively to each wireless communication unit (RCU) requesting a voice call such as a PSTN network phone and a mobile subscriber UE (User Equipment), subsequently leading to deterioration of system resources utilization efficiency. As is known, IP address resources are quite scare in the wireless communication system employing the all-IP architecture, therefore a new technique differing from conventional fixed-IP of assigning to each RCU that requestes a voice call is necessary.

In addition thereto, the system architecture in the prior art is disadvantaged by adopting different protocols for different services such as CS and PS, for example, the Megaco-protocol-based CS service transmission method and GTP-protocol-based PS transmission method in current 3GPP Release 4 architecture. This will make the system architectures and the type of the service not uniform, thus leading to reduction in utilization efficiency of communication resources and service efficiency.

SUMMARY OF THE DISCLOSURE

It is therefore an object of the present invention to overcome the disadvantages in the prior art, and the following technical solutions have been adopted to achieve the object.

According to a first aspect of the present disclosure, a method of handling voice call between Radio Communication Units (RCUs) of a wireless communication system in an all-IP architecture is provided. The wireless communication system comprises Core Network (CN) consisting of Mobile switch center MSC and Gateway Mobile Switch Center (GMSC), Radio Network Subsystem (RNS) consisting of a plurality of Radio Network Controllers (RNCs), and a plurality of RCUs. Said method comprising the following steps: A) when a first RCU is about to initiate voice call with a second RCU, a first agent address FA will be assigned to a corresponding mobile RCU via the RNC in which the mobile RCU resides; B) when the first RCU requests to talk to the second RCU, corresponding Media Gateway (MG) assigns a second agent address HA1 to the first RCU and assigns a second agent address HA2 to the second RCU, wherein both HA1 and HA2 are only valid during this call and are applied in mobile IP routing addressing of the all-IP network, and when the call is terminated or dropped, HA1 and HA2 will be released back to the pool of the IP addresses of the corresponding MG; C) carrying out appropriate resource configuration for corresponding RNC in which said first and second RCUs reside or the corresponding MG; D) transmitting VoIP data packets between said RNC of the two RCUs or corresponding MG according to said first agent address FA and said second agent addresses HA1 and HA2, thereby implementing voice call between said two RCUs.

According to an embodiment of the present invention, IP encapsulation will be effected for the transmitted VoIP data packets by means of said first agent address FA, said second agent addresses HA1 and HA2 in Step D, so that tunnels for transmitting said data packets will be established in foreign agents, avoiding need of transmitting an outer IP header in the radio section.

According to another embodiment of the present invention, the second agent address HA1 is assigned to the first RCU and the second agent address HA2 is assigned to the second RCU in accordance with the IP addresses distribution status in the pool of the IP addresses of corresponding MG. The assigned IP addresses can be re-assigned to other RCUs only after being released, and the IP addresses for MG at different locations differ from each other.

According to another embodiment of the present invention, said first RCU is a Mobile Station (MS), said second RCU is a PSTN phone, and the RNC in which the MS resides assigns an foreign agent address FA1 to the MS as its first agent address. When the two RCUs start a voice call, the PSTN MG assigns a temporary home agent address HA1 to the MS as its second agent address, and at the same time assigns a temporary IP address HA2 to the PSTN phone as its second agent address. IP encapsulation is performed on the data packets carrying voices from the PSTN MG to the RNC in which the MS resides by means of inner and outer IP headers, and wherein the source and destination addresses of the outer IP header of the data packet are HA2 and FA1, respectively, and the source and destination addresses of the inner IP header of the data packet are HA2 and HA1, respectively.

According to yet another embodiment of the present invention, said first RCU is a first MS, the second RCU is a second MS, and RNC1 in which the first MS resides assigns a foreign agent care-of address FA1 to the MS as its first agent address, RNC2 in which the second MS resides assigns a foreign agent care-of address FA2 to the MS as its first agent address. When the two RCUs start a voice call, corresponding MG assigns a temporary home agent address HA1 to the first MS as its second agent address, and at the same time assigns a temporary home agent address HA2 to the second MS as its second agent address. IP encapsulation is performed on the uplink data packets from the first MS to the second MS by means of inner and outer IP headers, wherein the source and destination addresses of outer IP header of the data packets are HA1 and FA2, respectively, and the source and destination addresses of inner IP header of the data packet are HA1 and HA2, respectively. IP encapsulation is performed on the uplink data packets from the second MS to the first MS, wherein the source and destination addresses of outer IP header of the packet are HA2 and FA1, respectively, and the source and destination addresses of inner IP header of the data packets are HA2 and HA1, respectively.

According to yet another embodiment of the present invention, when the mobile RCU in said RCUs registers with another RNC' which is different from the RNC in which said mobile RCU currently resides during the process of the voice call, said method further comprises the following steps: the another RNC' assigning a new foreign agent care-of address FA' to said mobile RCU as its first agent address while its second agent address remains unchanged; the VoIP data packets being transmitted between the two RCUs in accordance with the new foreign agent care-of address FA'.

According to a second aspect of the present invention, a wireless communication system employing an all-IP architecture is provided. The wireless communication system comprises Core Network (CN) consisting of Mobile switch center MSC and Gateway Mobile Switch Center (GMSC), Radio Network Subsystem (RNS) consisting of a plurality of Radio Network Controllers (RNCs), and a plurality of RCUs, characterized in that said system further comprising: means for assigning a first agent address FA to a corresponding mobile RCU when a first RCU is about to initiate voice call with a second RCU; means for assigning a second agent address HA1 to the first RCU and assigning a second agent address HA2 to the second RCU when the first RCU requests to talk to the second RCU, wherein both HA1 and HA2 are only valid during this call, and when the call is terminated or dropped, said HA1 and HA2 are released back to the pool of the IP addresses of corresponding MG; means for carrying out appropriate resource set-up for corresponding MG and the RNC in which the first and second RCUs reside; and means for transmitting VoIP data packets between the RNC of said two RCUs or corresponding MG according to said first agent address FA, said second agent addresses HA1 and HA2, thereby implementing voice call between said two RCUs.

According to an embodiment of the wireless communication system according to the present inveiton, the system further comprises means for performing IP encapsulation for the transmitted VoIP data packets according to said first agent address FA and said second agent addresses HA1 and HA2, so that tunnels for transmitting said data packets can be established in foreign agents, avoiding need of transmitting an outer IP header in the radio section.

According to another embodiment of the wireless communication system of the present inveiton, the system further comprises means for assigning the second agent address HA1 to the first RCU and assigning the second agent address HA2 to the second RCU in accordance with IP address distribution status in the pool of the IP addresses of corresponding MG, wherein the assigned IP addresses can be re-assigned to other RCUs only after being released, and the IP addresses in the MG at different locations are different form each other.

According to yet another embodiment of the wireless communication system of the present inveiton, said first RCU is a MS and said second RCU is a PSTN phone, and the RNC in which the MS resides assigns a foreign agent address FA1 to the MS as its first agent address. When the two RCUs start a voice call, the PSTN MG assigns to the MS a temporary home agent address HA1 as its second agent address, and at the same time assigns a temporary IP address HA2 to the PSTN phone as its second agent address. IP encapsulation is performed on the data packets carrying voices from PSTN MG to RNC in which the MS resides by means of inner and outer IP headers, wherein the source and destination addresses of the outer IP header of the data packet are HA2 and FA1, respectively, and the source and destination addresses of the inner IP header of the data packets are HA2 and HA1, respectively.

According to yet another embodiment of the wireless communication system of the present inveiton, said first RCU is a first MS, and said second RCU is a second MS. RNC1 in which the first MS resides assigns a foreign agent care-of address FA1 to the MS as its first agent address, and RNC2 in which the second MS resides assigns a foreign agent care-of address FA2 to the MS as its first agent address. When the two RCUs start a voice call, corresponding MG assigns a temporary home agent address HA1 to the first MS as its second agent address, and at the same time assigns a temporary home agent address HA2 to the second MS as its second agent address. IP encapsulation is performed on the uplink packets from the first MS to the second MS by means of inner and outer IP headers, wherein the source and destination addresses of the outer IP header of the data packets are HA1 and FA2, respectively, and the source and destination addresses of the inner IP header of the data packets are HA1 and HA2, respectively. IP encapsulation is performed on the uplink packets from the second MS to the first MS, wherein the source and destination addresses of the outer IP header of the packet are HA2 and FA1, respectively, and the source and destination addresses of the inner IP header of the packet ale HA2 and HA1, respectively.

According to yet another embodiment of the wireless communication system of the present inveiton, when the mobile RCU in said RCUs registers with another RNC' which is different from the RNC in which said mobile RCU currently resides during the process of the voice call, the another RNC' assigns a new foreign agent care-of address FA' to said mobile RCU as its first agent address while its second agent address remains unchanged, and the VoIP data packets are transmitted between the two RCUs according to the new foreign agent care-of address FA'.

As can be concluded from above discourses, voice call handling as included in the present invention has been optimized and thus differs from the conventional voice call setup and handling procedures. More specifically, the present invention proposes a novel method to control the mobility and call handling of voice services in the all-IP architecture. The method utilizes dynamic home agent technique in MobileIP to handle voice calls services. This method helps to reduce the number of propagation of the IP header in communication channel in a wireless environment, and enhance system resources utilization efficiency due to the dynamic assignment and release of care of IP addresses.

Further, the present invention applies MobileIP technique to transmission technique for the call service (CS) in 3G all-IP network. As compared with existing Megaco-protocol-based CS transmission method and GTP-protocol-based PS transmission method in current 3GPP release 4 architecture, the MobileIP-based CS and PS services may share a common system architecture, which makes the system architecture independent from the type of services. Moreover, if identical MobileIP architecture is utilized, at least one skip node can be reduced for PS service uplink, thus increasing service efficiency of the wireless communication system.

BRIEF DESCRIPTION OF THE DRAWINGS

The above and other objects, features and advantages of the present invention will become more apparent from the following detailed description when taken in conjunction with the accompanying drawings in which.

DESCRIPTION OF THE PREFERRED EMBODIMENT

Figure 1:
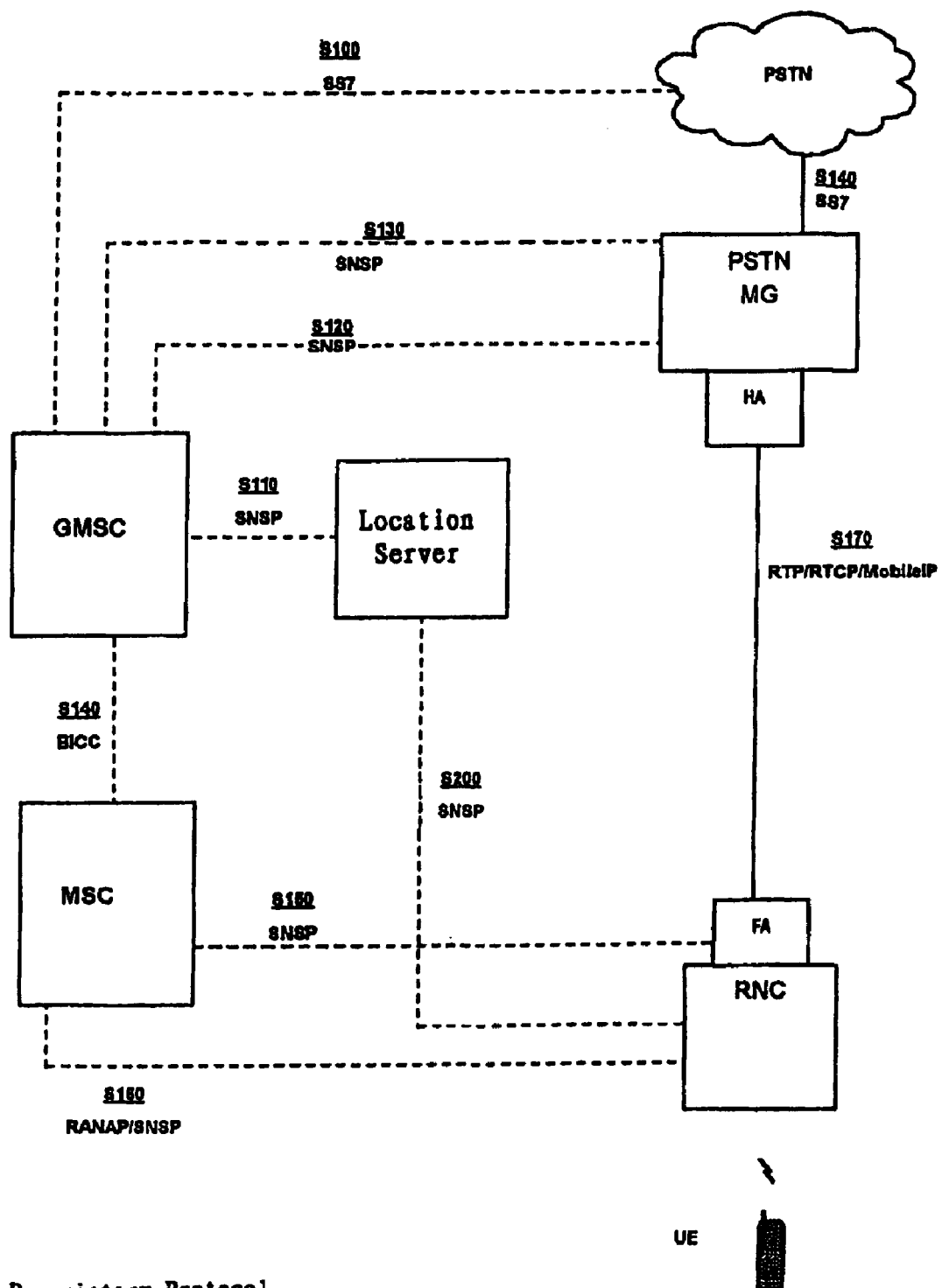
FIG. 1 is a flow chart illustrating an embodiment utilizing the method for voice call handling according to the present invention.

Referring to FIG. 1, this figure is a flow chart illustrating an embodiment utilizing the method for voice call handling according to the present invention. As shown in this Figure, the wireless communication network based on the all-IP architecture comprises the CN consisting of PSTN MG, MSC (Mobile switch center) server and GMSC (Gateway Mobile Switch Center) server, PSTN, RNC and a plurality of Mobile terminal subscriber UE. This Figure illustrates the procedure of the voice call between a UE and a PSTN phone only in an illustrative but not in a restrictive way.

When the UE roams to an area served by a certain RNC, the RNC will assign a MobileIP foreign agent care-of address to the UE. The assigned address is the address of serving dedicated resource board in the RNC, the dedicated resource board may support a plurality of subscribers and managed/controlled by the RNC. This address is also called UE-FA-Address (FA). The RNC will subsequently update the care-of address of the UE in the Location Server (Step S200). As for incoming calls from PSTN to UE, GMSC server firstly receives the call request from the PSTN (Step S100); the GMSC server retrieves the current location (RNC address) of the UE from the Location Server (Step S110); then, the GMSC server asks the corresponding PSTM MG to assign a dynamic home agent IP address (UE-Call-Address) within its subnet to the UE for that particular call (Step S120). A UE is assigned a temporary home agent (HA) address, UE-Call-Address, when it requests for voice call services. This HA IP address is only valid during the call and will be used for MobileIP routing in the all-IP network. When the call is terminated or dropped, the HA IP address will be released and return to the pool of IP addresses owned by the PSTN MG. This mode conserves to the best extent address space of the care-of address of the FA, and the care-of address of the FA can be shared by all connected UEs rather than exclusively used by each UF. When a PSTN phone asks for voice call with a certain UE, the GMSC server asks corresponding PSTN MG to assign a corresponding node IP address (PSTN-Phone-Address) within its subnet to the source PSTN phone for that particular call (Step S120). This IP address (PSTN-Phone-Address) is only temporary, and valid only during the call and will be used for MobileIP routing in the all-IP network. When the call is terminated or dropped, the IP address will be released and return to the pool of IP addresses owned by the PSTN MG. The GMSC server will then set up appropriate resources in the PSTN MG (Step S130); the GMSC server talks to the MSC server in which the UE Mobility Management (MM) context resides (Step S140); the MSC server sets up appropriate resource in the RNC that the UE roams to (Step S150); the MSC server transfers the incoming PSTN call processing to Call Control/Mobility Management (CC/MM) unit in 3G and sends it to the UE (Step S160). The RNC and PSTN MG start to send/receive VoIP data packets via MobileIP (Step S170).

The basis for assigning temporary IP address to a UE and a PSTN phone as described abode is that the assigned IP addresses can be re-assigned to other PSTN or UE only when they are released. IP addresses in PSTN MG at different locations differ from each other, for example, in Beijing it could be 200.xxx.xxx.xxx while in Shenzhen it could be 201.xxx.xxx.xxx. According to the number of the accessed local MG subscribers, certain number of IP addresses remain un-assigned in the pool of the IP addresses. For the incoming call from PSTN to UE, the PSTN and UE will be assigned randomly a temporary PSTN-Phone-Address and a temporary UE-Call-Address, respectively. When the call is terminated or dropped, the two IP addresses will be released and can be re-assigned by PSTN MG to other call services.

Figure 2:
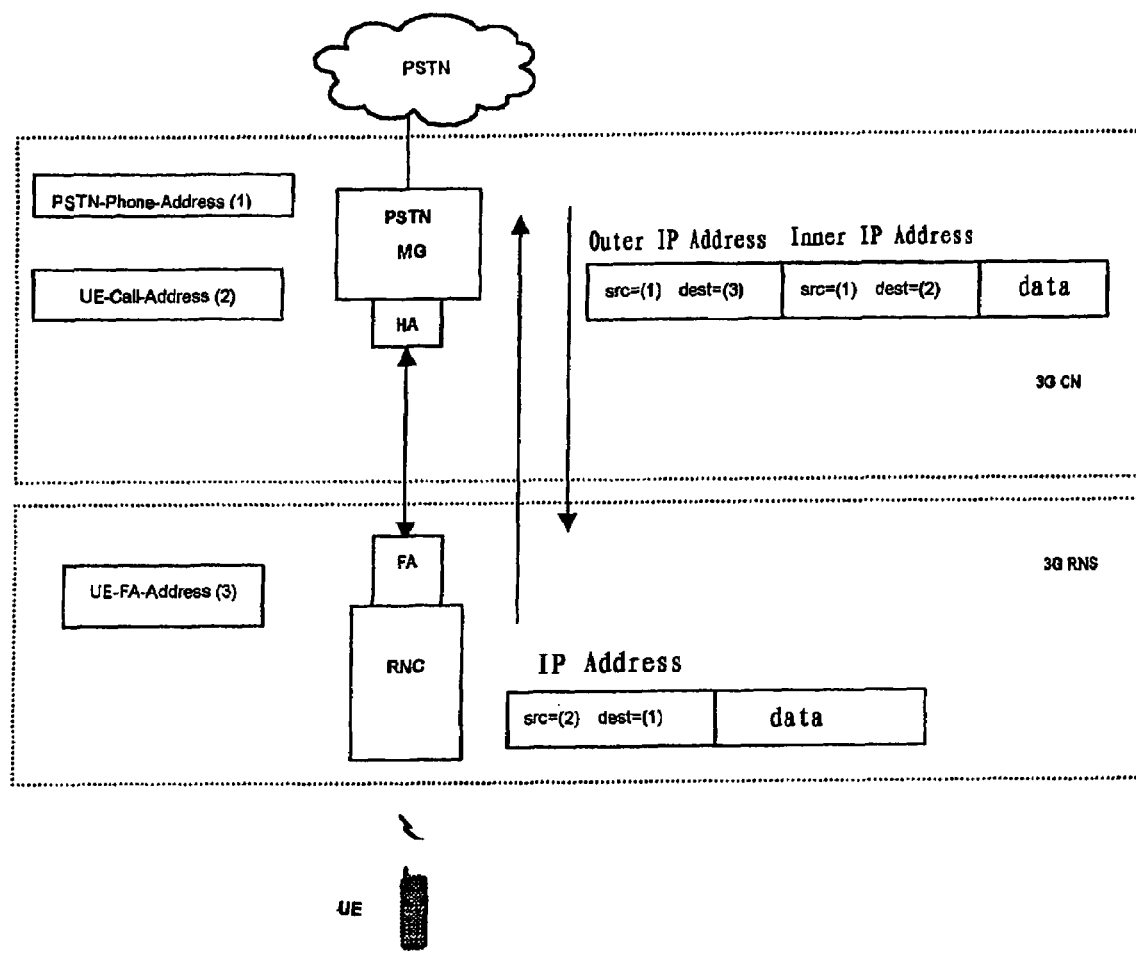
FIG. 2 is a diagram illustrating IP encapsulation of the data packets carrying voices in accordance with the embodiment in FIG. 1.

Descriptions of the process for IP encapsulation of data packets sent/received between the PSTN phone and UE requesting a voice call lo will be given in conjunction with FIG. 2. For the downlink IP data packets from the PSTN MG to RNC, IP encapsulation is required. That is, an inner IP packet carrying voice is encapsulated with an outer IP address. The source IP address of the outer IP header is PSTN-Phone-address, and the destination IP address of the outer IP header is UE-FA-Address (FA). The source IP address of the inner IP header is PSTN-Phone-address, and the destination IP address of the inner IP header is the UE-Call-Address (HA). In a wireless environment where radio resources are scarce, the adoption of foreign agents means that the channel is established in the foreign agents and there is no need of transmitting the outer IP header in the radio section, thus enhancing radio resource utilization efficiency. For the uplink data packets from the RNC to the PSTN MG, IP encapsulation will not be needed. The source IP address of the IP header is UE-Call-Address (HA) and the destination IP address is PSTN-Phone-address.

By means of this encapsulation method, the encapsulated packets are delivered to a foreign agent which strips the foreign IP address and forwards the inner IP packets to UE via radio channels. As for conventional techniques, the home agent forwards the whole encapsulated data packets directly to UE who will open the outer IP address and process inner IP data packets. In a wireless environment where radio resources are scarce, the adoption of foreign agents means that the channel is established in the foreign agents and there is no need of transmitting the outer IP header in the radio section, thus enhancing radio resource utilization efficiency.

Figure 3:
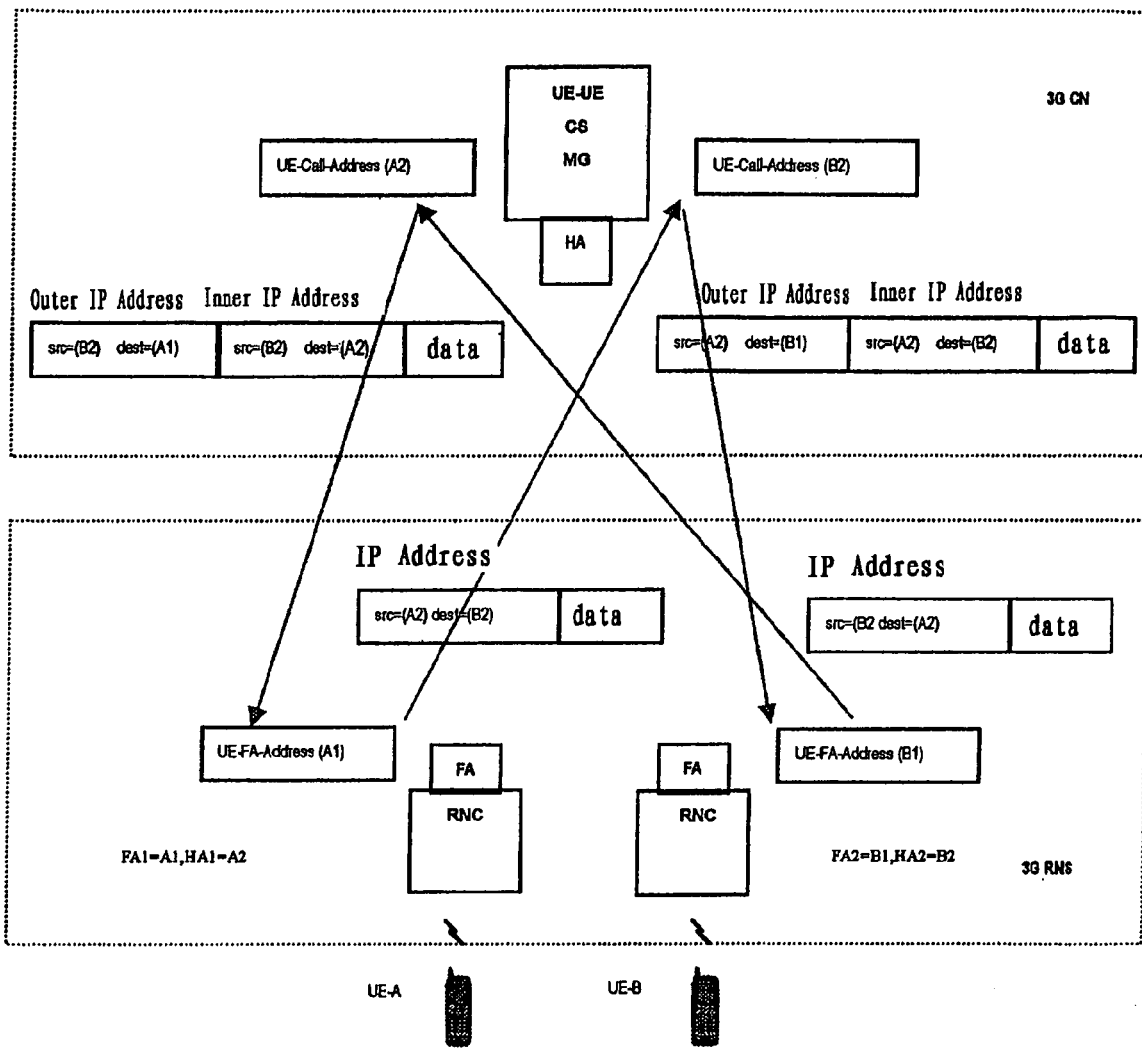
FIG. 3 is a flow chart illustrating another embodiment of the method for voice call handling according to the present invention.

The above said dynamic home agent technique and IP encapsulation method may also be applied to the handling of voice call between UEs. The mechanism for the handling of voice call between UEs is similar as the mechanism for UE-PSTN voice service, except that this mechanism combines the two mechanisms of UE-PSTN and PSTN-UE. FIG. 3 is a flow chart illustrating another embodiment of the method for voice call handling according to the present invention, wherein the voice call is occurred between UE-A and UE-B. As in UE-PSTN voice call handling process, the RNC-A and RNC-B in which UE-A and UE-B resides, respectively, assign foreign agent care-of addresses UE-FA-Address (FA1) and UE-FA-Address (FA2) to RNC-A and RNC-B.

When UE-A requests to talks to UE-B, UE-UE CS MG will assign temporary dynamic home agent addresses UE-CALL-Address (HA1) and UE-CALL-Address (HA2) to UE-A and UE-B, respectively. It shall be noted herein that in this situation, there is no need to assign a corresponding IP addresses to the voice call, because all entities have their own IP addresses. As to UE-A, its foreign agent care-of address is UE-FA-Address (FA1), its dynamic home agent address is UE-Call-Address (HA1), and the IP address of the corresponding voice calling entity is UE-Call-Address (HA2); As to UE-B, its foreign agent care-of address is UE-FA-Address (FA2), its dynamic home agent address UE-Call-Address (HA2), and the IP address of the corresponding voice calling entity is UE-Call-Address (HA1).

Therefore, when UE-A requests to talk to UE-B, as to the uplink from UE-A to UE-B as shown by the triangle route illustrated by arrows in FIG. 3, the UE-A sends VoIP data packets directly to its corresponding IP node, that is, from UE-CALL-address (HA1) to UE-Call-Address (HA2). However, when UE-UE CS MG receives the IP packets, it forwards the packets by tunneling technique to the foreign agent care-of address UE-FA-Address (FA2) of UE-B. That is to say, the IP data packets sent by tunneling technique shall be subjected to IP encapsulation,with the source address and the destination address for the outer IP header being UE-Call-Address (HA1) and UE-FA-Address (FA2), respectively, and the source address and the destination address for the inner IP header being UE-Call-Address (HA1) and UE-HA-Address (HA2), respectively.

Similarly, when UE-B requests to talk to UE-A, the mechanism as mentioned above also can be used to process the voice call.

Likewise, the above said method according to the present invention can also be applied to handle corresponding voice call service when the UE being in the voice call initiates handoff, and process of the handling will be described based on FIG. 1. As illustrated in FIG. 1, when the UE roams from one RNC to another RNC during a call, the new RNC assigns a new care-of address to the UE; the new RNC will then update the Location Server; the Location Serversubsequently updates the care-of address of the UE in the GMSC server; the GMSC talks to PSTN MG; the PSTN MG updates the new care-of address of the UE; the new RNC and PSTN MG start to send/receive VoIP data packets via MobileIP according to the above said voice call handling method. It therefore can be concluded that by means of employing the dynamic home agent address technology, when the UE initiates handoff the call will not be interrupted, and so that soft handoff can be realized.

Likewise, two UEs which are performing a voice call can also achieve soft handoff using the same handling method described above.

Figure 4:
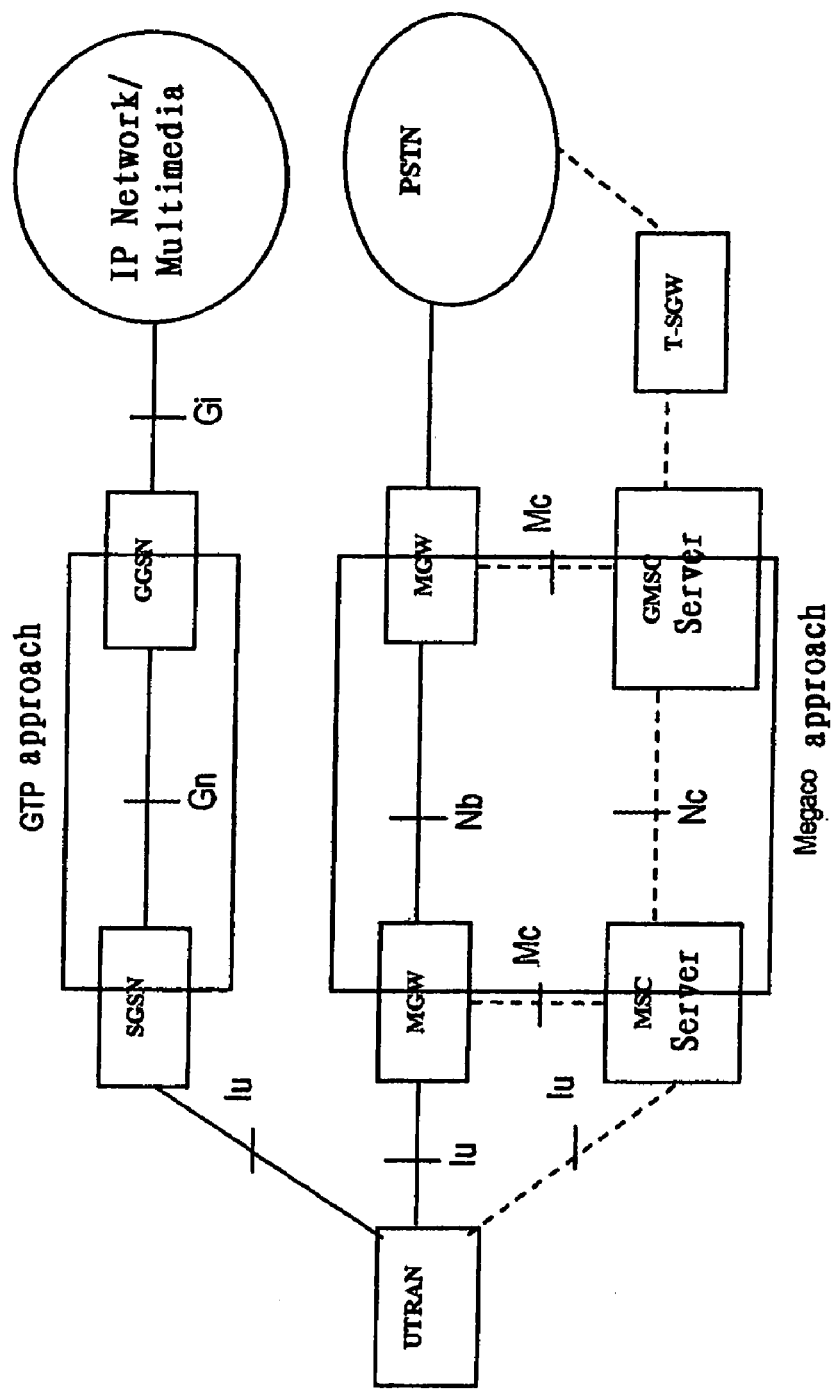
FIG. 4 is a diagram illustrating the structure of a wireless communication system based on 3GPP Release 4.
Figure 5:
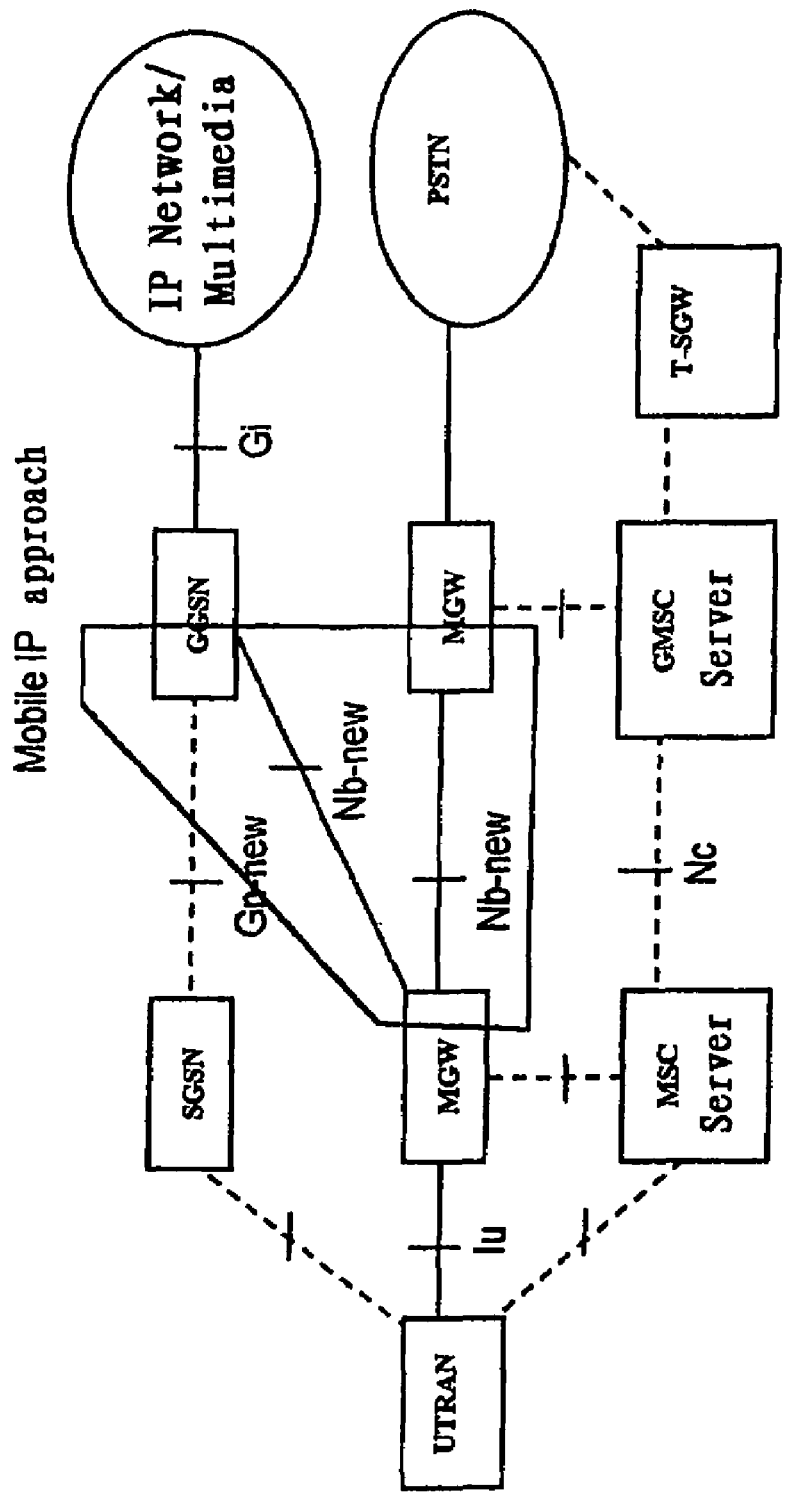
FIG. 5 is a diagram illustrating the structure of a wireless communication system based on the dynamic IP technique of the present invention.

FIGS. 4 and 5 respectively illustrate the structural diagrams of a wireless communication system based on 3GPP Release 4 and on the dynamic IP technique according to the present invention. In the field of Release 4 PS, SGSN is responsible for transmission of both data and signal stream. But in CS field, transmission of signal and data streams is separate. Media Gateway (MGW) is responsible for transmission of both signal and data while MSC is only responsible for transmission of signal stream. MSC is responsible for voice call handling in CS field, and Call Control/Mobility Management (CC/MM). The solidlines in FIGS. 4 and 5 indicate the common transmission path for signal and data while dotted lines indicates only signal transmission. In the MobileIP-based new architecture, SGSN is responsible only for the transmission of signals, as indicated by the dotted lines in FIG. 5. SGSN still handles GMM/SM for PS field, while MGW only handles PS data transmission. By means of separating the transmission of signals and data stream, PS and CS share the same system architecture. In Release 4, GTP-based Gn interface is used for both signal and data transmission, while in the all-IP new architecture, Gn-new is used only for signal transmission.

In PS field of Release 4, mobility control and data transmission mechanism are both GTP-based, while in the new architecture, PS field mobility control and data transmission mechanism are MobileIP-based. For PS service uplink, at least one skip node can be eliminated, i.e. the SGSN in the old architecture can be omitted, as shown in FIG. 5.

In CS field of Release 4, mobility control and data transmission mechanism are both Megaco-based, while in the new architecture CS field mobility control and data transmission mechanism are MobileIP-based. The RNC in UTRAN is the foreign agent, and the MGW connected with PSTN is the home agent.

The present invention applies MobileIP technique to call service (CS) transmission in 3G all-IP network. As compared with current Megaco-based CS transmission method and GTP-based PS transmission method in 3GPP Release 4 (as shown in FIG. 4), MobileIP-based CS and PS services may share the same system architecture, which makes the system architecture independent from the type of services. Moreover, if identical MobileIP architecture is utilized, at least one skip node can be reduced for PS service uplink, i.e., the SGSN in the old architecture can be omitted. As shown in FIG. 5, GGSN is the Home Agent, and MGW is the Foreign Agent.

Numerous characteristics and advantages of representative embodiments of the present invention have been set forth in the foregoing description. It is to be understood, however, that while particular forms or embodiments of the invention have been illustrated, various modifications can be made without departing from the sprit and scope of the invention.

What is claimed is:

1. A method of handling voice call between Radio Communication Units (RCUs) of a wireless communication system in an all-IP architecture, wherein said wireless communication system comprises Core Network (CN) consisting of Mobile switch center MSC and Gateway Mobile Switch Center (GMSC), Radio Network Subsystem (RNS) consisting of a plurality of Radio Network Controllers (RNCs), and a plurality of RCUs, said method comprising the following steps:

A) when a first RCU is about to initiate voice call with a second RCU, a first agent address FA will be assigned to a corresponding mobile RCU via the RNC in which the mobile RCU resides;

B) when the first RCU requests to talk to the second RCU, corresponding Media Gateway (MG) assigns a second agent address HA1 to the first RCU and assigns a second agent address HA2 to the second RCU, wherein both HA1 and HA2 are only valid during this call and are applied in mobile IP routing addressing of the all-IP network, and when the call is terminated or dropped, HA1 and HA2 will be released back to the pool of the IP addresses of the corresponding MG;

C) carrying out appropriate resource configuration for corresponding RNC in which said first and second RCUs reside or the corresponding MG;

D) transmitting VoIP data packets between said RNC of the two RCUs or corresponding MG according to said first agent address FA and said second agent addresses HA1 and HA2, thereby implementing voice call between said two RCUs.

2. The method according to claim 1, wherein IP encapsulation will be effected for the transmitted VoIP data packets by means of said first agent address FA, said second agent addresses HA1 and HA2 in Step D, so that tunnels for transmitting said data packets will be established in foreign agents, avoiding need of transmitting an outer IP header in the radio section.

3. The method according to claim 1, wherein the second agent address HA1 is assigned to the first RCU and the second agent address HA2 is assigned to the second RCU in accordance with the IP addresses distribution status in the pool of the IP addresses of corresponding MG, and the assigned IP addresses can be re-assigned to other RCUs only after being released, and the IP addresses for MG at different locations differ from each other.

4. The method according to claim 1, wherein said first RCU is a Mobile Station (MS), said second RCU is a PSTN phone, and the RNC in which the MS resides assigns an foreign agent address FAl to the MS as its first agent address; when the two RCUs start a voice call, the PSTN MG assigns a temporary home agent address HA1 to the MS as its second agent address, and at the same time assigns a temporary IP address HA2 to the PSTN phone as its second agent address; IP encapsulation is performed on the data packets carrying voices from the PSTN MG to the RNC in which the MS resides by means of inner and outer IP headers, and wherein the source and destination addresses of the outer IP header of the data packet are HA2 and FAl, respectively, and the source and destination addresses of the inner IP header of the data packet are HA2 and HA1, respectively.

5. The method according to claim 1, wherein said first RCU is a first MS, the second RCU is a second MS, and RNC1 in which the first MS resides assigns a foreign agent care-of address FAl to the MS as its first agent address, RNC2 in which the second MS resides assigns a foreign agent care-of address FA2 to the MS as its first agent address; when the two RCUs start a voice call, corresponding MG assigns a temporary home agent address HA1 to the first MS as its second agent address, and at the same time assigns a temporary home agent address HA2 to the second MS as its second agent address; IP encapsulation is performed on the uplink data packets from the first MS to the second MS by means of inner and outer IP headers, wherein the source and destination addresses of outer IP header of the data packets are HA1 and FA2, respectively, and the sourpe and destination addresses of inner IP header of the data packet are HA1 and HA2, respectively; and IP encapsulation is performed on the uplink data packets from the second MS to the first MS, wherein the source and destination addresses of outer IP header of the packet are HA2 and FAl, respectively, and the source and destination addresses of inner IP header of the data packets are HA2 and HA1, respectively.

6. The method according to claim 1, wherein when the mobile RCU in said RCUs registers with another RNC' which is different from the RNC in which said mobile RCU currently resides during the process of the voice call, said method further comprises the following steps:

E) the another RNC' assigning a new foreign agent care-of address FA' to said mobile RCU as its first agent address while its second agent address remains unchanged;

F) the VoIP data packets being transmitted between the two RCUs in accordance with the new foreign agent care-of address FA'.

7. A wireless communication system employing an all-IP architecture, comprising Core Network (CN) consisting of Mobile switch center MSC and Gateway Mobile Switch Center (GMSC), Radio Network Subsystem (RNS) consisting of a plurality of Radio Network Controllers (RNCs), and a plurality of RCUs, characterized in that said system further comprising:

means for assigning a first agent address FA to a corresponding mobile RCU when a first RCU is about to initiate voice call with a second RCU;

means for assigning a second agent address HA1 to the first RCU and assigning a second agent address HA2 to the second RCU when the first RCU requests to talk to the second RCU, wherein both HA1 and HA2 are only valid during this call, and when the call is terminated or dropped, said HA1 and HA2 are released back to the pool of the IP addresses of corresponding MG;

means for carrying out appropriate resource set-up for corresponding MG and the RNC in which the first and second RCUs reside;

means for transmitting VoIP data packets between the RNC of said two RCUs or corresponding MG according to said first agent address FA, said second agent addresses HA1 and HA2, thereby implementing voice call between said two RCUs.

8. The wireless communication system according to claim 7, further comprising means for performing IP encapsulation for the transmitted VoIP data packets according to said first agent address FA and said second agent addresses HA1 and HA2, so that tunnels for transmitting said data packets can be established in foreign agents, avoiding need of transmitting an outer IP header in the radio section.

9. A wireless communication system according to claim 7, further comprising means for assigning the second agent address HA1 to the first RCU and assigning the second agent address HA2 to the second RCU in accordance with IP address distribution status in the pool of the IP addresses of corresponding MG, wherein the assigned IP addresses can be re-assigned to other RCUs only after being released, and the IP addresses in the MG at different locations are different form each other.

10. The wireless communication system according to claim 8, wherein said first RCU is a MS and said second RCU is a PSTN phone, and the RNC in which the MS resides assigns a foreign agent address FAl to the MS as its first agent address; when the two RCUs start a voice call, the PSTN MG assigns to the MS a temporary home agent address HA1 as its second agent address, and at the same time assigns a temporary IP address HA2 to the PSTN phone as its second agent address; IP encapsulation is performed on the data packets carrying voices from PSTN MG to RNC in which the MS resides by means of inner and outer IP headers, wherein the source and destination addresses of the outer IP header of the data packet are HA2 and FA1, respectively, and the source and destination addresses of the inner IP header of the data packets are HA2 and HA1, respectively.

11. The wireless communication system according to claim 8, wherein said first RCU is a first MS, and said second RCU is a second MS; RNC1 in which the first MS resides assigns a foreign agent care-of address FA1 to the MS as its first agent address, and RNC2 in which the second MS resides assigns a foreign agent care-of address FA2 to the MS as its first agent address; when the two RCUs start a voice call, corresponding MG assigns a temporary home agent address HA1 to the first MS as its second agent address, and at the same time assigns a temporary home agent address HA2 to the second MS as its second agent address; IP encapsulation is performed on the uplink packets from the first MS to the second MS by means of inner and outer IP headers, wherein the source and destination addresses of the outer IP header of the data packets are HA1 and FA2, respectively, and the source and destination addresses of the inner IP header of the data packets are HA1 and HA2, respectively; and, IP encapsulation is performed on the uplink packets from the second MS to the first MS, wherein the source and destination addresses of the outer IP header of the packet are HA2 and FA1, respectively, and the source and destination addresses of the inner IP header of the packet are HA2 and HA1, respectively.

12. The wireless communication system according to claim 7, wherein when the mobile RCU in said RCUs registers with another RNC' which is different from the RNC in which said mobile RCU currently resides during the process of the voice call, the another RNC' assigns a new foreign agent care-of address FA' to said mobile RCU as its first agent address while its second agent address remains unchanged, and the VoIP data packets are transmitted between the two RCUs according to the new foreign agent care-of address FA'.

* * * * *